US007415117B2

(12) United States Patent
Tashev et al.

(10) Patent No.: US 7,415,117 B2
(45) Date of Patent: Aug. 19, 2008

(54) SYSTEM AND METHOD FOR BEAMFORMING USING A MICROPHONE ARRAY

(75) Inventors: Ivan Tashev, Kirkland, WA (US); Henrique Malvar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 10/792,313

(22) Filed: Mar. 2, 2004

(65) Prior Publication Data

US 2005/0195988 A1 Sep. 8, 2005

(51) Int. Cl.
*H04R 3/00* (2006.01)
*H04B 15/00* (2006.01)
*H04B 3/00* (2006.01)
*G01S 3/80* (2006.01)
*G06F 15/00* (2006.01)
*G10L 19/14* (2006.01)
*G10L 21/00* (2006.01)

(52) U.S. Cl. ............................. 381/92; 381/93; 381/66; 367/119; 702/191; 702/194; 704/225; 704/226

(58) Field of Classification Search ................... 381/92, 381/91, 93, 66; 367/119, 901; 702/191, 702/194; 704/225, 226
See application file for complete search history.

(56) References Cited

U.S. PATENT DOCUMENTS 4,729,077 A * 3/1988 Gordin et al. ............... 362/285
5,479,614 A * 12/1995 Aoe et al. ............... 707/103 R
6,487,574 B1 11/2002 Malvar
6,496,795 B1 * 12/2002 Malvar ........................ 704/203

OTHER PUBLICATIONS

S. Nordholm, I. Claesson, M. Dahl. "Adaptive microphone array employing calibration signals; an analytical evaluation". *IEEE Trans. on Speech and Audio Processing*, vol. 7, pp. 241-252, May 1999.

D. A. Florêncio and H. S. Malvar, "Multichannel filtering for optimum noise reduction in microphone arrays," *Proc. International Conference on Acoustic, Speech, and Signal Processing*, pp. 197-200, May 2001.

(Continued)

*Primary Examiner*—Vivian Chin
*Assistant Examiner*—George C Monikang
(74) *Attorney, Agent, or Firm*—Lyon & Harr, LLP; Mark A. Watson

(57) ABSTRACT

The ability to combine multiple audio signals captured from the microphones in a microphone array is frequently used in beamforming systems. Typically, beamforming involves processing the output audio signals of the microphone array in such a way as to make the microphone array act as a highly directional microphone. In other words, beamforming provides a "listening beam" which points to a particular sound source while often filtering out other sounds. A "generic beamformer," as described herein automatically designs a set of beams (i.e., beamforming) that cover a desired angular space range within a prescribed search area. Beam design is a function of microphone geometry and operational characteristics, and also of noise models of the environment around the microphone array. One advantage of the generic beamformer is that it is applicable to any microphone array geometry and microphone type.

35 Claims, 5 Drawing Sheets

OTHER PUBLICATIONS

M. Seltzer, B. Raj. "Calibration of Microphone arrays for improved speech recognition". *Mitsubishi Research Laboratories Technical Report*, TR-2001-43, Dec. 2001.

H. Teutsch and G. Elko. "An adaptive close-talking microphone array," *Proc. IEEE Workshop on Applications of Signal Processing to Audio and Acoustics*, pp. 163-166, Oct. 2001.

H. Wang and P. Chu, "Voice source localization for automatic camera pointing system in videoconferencing," *Proc. International Conference on Acoustic, Speech, and Signal Processing*, pp. 187-190, Apr. 1997.

R. Duraiswami, D. Zotkin, and L. S. Davis, "Active speech source localization by a dual coarse-to-fine search," *Proc. International Conference on Acoustic, Speech, and Signal Processing*, pp. 3309-3312, May 2001.

* cited by examiner

SYSTEM AND METHOD FOR BEAMFORMING USING A MICROPHONE ARRAY

BACKGROUND

1. Technical Field

The invention is related to finding the direction to a sound source in a prescribed search area using a beamsteering approach with a microphone array, and in particular, to a system and method that provides automatic beamforming design for any microphone array geometry and for any type of microphone.

2. Background Art

Localization of a sound source or direction within a prescribed region is an important element of many systems. For example, a number of conventional audio conferencing applications use microphone arrays with conventional sound source localization (SSL) to enable speech or sound originating from a particular point or direction to be effectively isolated and processed as desired.

For example, conventional microphone arrays typically include an arrangement of microphones in some predetermined layout. These microphones are generally used to simultaneously capture sound waves from various directions and originating from different points in space. Conventional techniques such as SSL are then used to process these signals for localizing the source of the sound waves and for reducing noise. One type of conventional SSL processing uses beamsteering techniques for finding the direction to a particular sound source. In other words, beamsteering techniques are used to combine the signals from all microphones in such a way as to make the microphone array act as a highly directional microphone, pointing a "listening beam" to the sound source. Sound capture is then attenuated for sounds coming from directions outside that beam. Such techniques allow the microphone array to suppress a portion of ambient noises and reverberated waves (generated by reflections of sound on walls and objects in the room), and thus providing a higher signal to noise ratio (SNR) for sound signals originating from within the target beam.

Beamsteering typically allows beams to be steered or targeted to provide sound capture within a desired spatial area or region, thereby improving the signal-to-noise ratio (SNR) of the sounds recorded from that region. Therefore, beamsteering plays an important role in spatial filtering, i.e., pointing a "beam" to the sound source and suppressing any noises coming from other directions. In some cases the direction to the sound source is used for speaker tracking and post-processing of recorded audio signals. In the context of a video conferencing system, speaker tracking is often used for dynamically directing a video camera toward the person speaking.

In general, as is well known to those skilled in the art, beamsteering involves the use of beamforming techniques for forming a set of beams designed to cover particular angular regions within a prescribed area. A beamformer is basically a spatial filter that operates on the output of an array of sensors, such as microphones, in order to enhance the amplitude of a coherent wavefront relative to background noise and directional interference. A set of signal processing operators (usually linear filters) is then applied to the signals form each sensor, and the outputs of those filters are combined to form beams, which are pointed, or steered, to reinforce inputs from particular angular regions and attenuate inputs from other angular regions.

The "pointing direction" of the steered beam is often referred to as the maximum or main response angle (MRA), and can be arbitrarily chosen for the beams. In other words, beamforming techniques are used to process the input from multiple sensors to create a set of steerable beams having a narrow angular response area in a desired direction (the MRA). Consequently, when a sound is received from within a given beam, the direction of that sound is known (i.e., SSL), and sounds emanating from other beams may be filtered or otherwise processed, as desired.

One class of conventional beamforming algorithms attempts to provide optimal noise suppression by finding parametric solutions for known microphone array geometries. Unfortunately, as a result of the high complexity, and thus large computational overhead, of such approaches, more emphasis has been given to finding near-optimal solutions, rather than optimal solutions. These approaches are often referred to as "fixed-beam formation."

In general, with fixed-beam formation, the beam shapes do not adapt to changes in the surrounding noises and sound source positions. Further, the near-optimal solutions offered by such approaches tend to provide only near-optimal noise suppression for off-beam sounds or noise. Consequently, there is typically room for improvement in noise or sound suppression offered by such conventional beamforming techniques. Finally, such beamforming algorithms tend to be specifically adapted for use with particular microphone arrays. Consequently, a beamforming technique designed for one particular microphone array may not provide acceptable results when applied to another microphone array of a different geometry.

Other conventional beamforming techniques involve what is known as "adaptive beamforming." Such techniques are capable of providing noise suppression based on little or no a priori knowledge of the microphone array geometry. Such algorithms adapt to changes in ambient or background noise and to the sound source position by attempting to converge upon an optimal solution as a function of time, thereby providing optimal noise suppression after convergence. Unfortunately, one disadvantage of such techniques is their significant computational requirements and slow adaptation, which makes them less robust to wide varieties in application scenarios.

Consequently, what is needed is a system and method for providing better optimized beamforming solutions for microphone arrays. Further, such a system and method should reduce computational overhead so that real-time beamforming is realized. Finally, such a system and method should be applicable for microphone arrays of any geometry and including any type of microphone.

SUMMARY

The ability to combine multiple audio signals captured from the microphones in a microphone array is frequently used in beamforming systems. In general, beamforming operations are applicable to processing the signals of a number of receiving arrays, including microphone arrays, sonar arrays, directional radio antenna arrays, radar arrays, etc. For example, in the case of a microphone array, beamforming involves processing output audio signals of the microphone array in such a way as to make the microphone array act as a highly directional microphone. In other words, beamforming provides a "listening beam" which points to, and receives, a particular sound source while attenuating other sounds and noise, including, for example, reflections, reverberations, interference, and sounds or noise coming from other directions or points outside the primary beam. Pointing of such beams is typically referred to as "beamsteering."

Note that beamforming systems also frequently apply a number of types of noise reduction or other filtering or post-processing to the signal output of the beamformer. Further, time or frequency-domain pre-processing of sensor array outputs prior to beamforming operations is also frequently used with conventional beamforming systems. However, for purposes of explanation, the following discussion will focus on beamforming design for microphone arrays of arbitrary geometry and microphone type, and will consider only the noise reduction that is a natural consequence of the spatial filtering resulting from beamforming and beamsteering operations. Any desired conventional pre- or post-processing or filtering of the beamformer input or output should be understood to be within the scope of the description of the generic beamformer provided herein.

A "generic beamformer," as described herein, automatically designs a set of beams (i.e., beamforming) that cover a desired angular space range. However, unlike conventional beamforming techniques, the generic beamformer described herein is capable of automatically adapting to any microphone array geometry, and to any type of microphone. Specifically, the generic beamformer automatically designs an optimized set of steerable beams for microphone arrays of arbitrary geometry and microphone type by determining optimal beam widths as a function of frequency to provide optimal signal-to-noise ratios for in-beam sound sources while providing optimal attenuation or filtering for ambient and off-beam noise sources. The generic beamformer provides this automatic beamforming design through a novel error minimization process that automatically determines optimal frequency-dependant beam widths given local noise conditions and microphone array operational characteristics. Note that while the generic beamformer is applicable to sensor arrays of various types, for purposes of explanation and clarity, the following discussion will assume that the sensor array is a microphone array comprising a number of microphones with some known geometry and microphone directivity.

In general, the generic beamformer begins the design of optimal fixed beams for a microphone array by first computing a frequency-dependant "weight matrix" using parametric information describing the operational characteristics and geometry of the microphone array, in combination with one or more noise models that are automatically generated or computed for the environment around the microphone array. This weight matrix is then used for frequency domain weighting of the output of each microphone in the microphone array in frequency-domain beamforming processing of audio signals received by the microphone array.

The weights computed for the weight matrix are determined by calculating frequency-domain weights for a desired "focus points" distributed throughout the workspace around the microphone array. The weights in this weight matrix are optimized so that beams designed by the generic beamformer will provide maximal noise suppression (based on the computed noise models) under the constraints of unit gain and zero phase shift in any particular focus point for each frequency band. These constraints are applied for an angular area around the focus point, called the "focus width." This process is repeated for each frequency band of interest, thereby resulting in optimal beam widths that vary as a function of frequency for any given focus point.

In one embodiment, beamforming processing is performed using a frequency-domain technique referred to as Modulated Complex Lapped Transforms (MCLT). However, while the concepts described herein use MCLT domain processing by way of example, it should be appreciated by those skilled in the art, that these concepts are easily adaptable to other frequency-domain decompositions, such as, for example, fast Fourier transform (FFT) or FFT-based filter banks. Note that because the weights are computed for frequency domain weighting, the weight matrix is an N×M matrix, where N is the number of MCLT frequency bands (i.e., MCLT subbands) in each audio frame and M is the number of microphones in the array. Therefore, assuming, for example, the use of 320 frequency bins for MCLT computations, an optimal beam width for any particular focus point can be described by plotting gain as a function of incidence angle and frequency for each of the 320 MCLT frequency coefficients. Note that using a large number of MCLT subbands (e.g. 320) allows for two important advantages of the frequency-domain technique: i) fine tuning of the beam shapes for each frequency subband; and ii) simplifying the filter coefficients for each subband to single complex-valued gain factors, allowing for computationally efficient implementations.

The parametric information used for computing the weight matrix includes the number of microphones in the array, the geometric layout of the microphones in the array, and the directivity pattern of each microphone in the array. The noise models generated for use in computing the weight matrix distinguish at least three types of noise, including isotropic ambient noise (i.e., background noise such as "white noise" or other relatively uniformly distributed noise), instrumental noise (i.e., noise resulting from electrical activity within the electrical circuitry of the microphone array and array connection to an external computing device or other external electrical device) and point noise sources (such as, for example, computer fans, traffic noise through an open window, speakers that should be suppressed, etc.)

Therefore, given the aforementioned noise models, the solution to the problem of designing optimal fixed beams for the microphone array is similar to a typical minimization problem with constraints that is solved by using methods for mathematical multidimensional optimization (simplex, gradient, etc.). However, given the relatively high dimensionality of the weight matrix (2M real numbers per frequency band, for a total of N×2M numbers), which can be considered as a multimodal hypersurface, and because the functions are non-linear, finding the optimal weights as points in the multimodal hypersurface is very computationally expensive, as it typically requires multiple checks for local minima.

Consequently, in one embodiment, rather than directly finding optimal points in this multimodal hypersurface, the generic beamformer first substitutes direct multidimensional optimization for computation of the weight matrix with an error minimizing pattern synthesis, followed by a single dimensional search towards an optimal beam focus width for each frequency band. Any conventional error minimization technique can be used here, such as, for example, least-squares or minimum mean-square error (MMSE) computations, minimum absolute error computations, min-max error computations, equiripple solutions, etc.

In general, in finding the optimal solution for the weight matrix, two contradicting effects are balanced. Specifically, given a narrow focus area for the beam shape, ambient noise energy will naturally decrease due to increased directivity. In addition, non-correlated noise (including electrical circuit noise) will naturally increase since a solution for better directivity will consider smaller and smaller phase differences between the output signals from the microphones, thereby boosting the non-correlated noise. Conversely, when the target focus area of the beam shape is larger, there will naturally be more ambient noise energy, but less non-correlated noise energy.

Therefore, the generic beamformer considers a balance of the above-noted factors in computing a minimum error for a particular focus area width to identify the optimal solution for weighting each MCLT frequency band for each microphone in the array. This optimal solution is then determined through pattern synthesis which identifies weights that meet the least squares (or other error minimization technique) requirement for particular target beam shapes. Fortunately, by addressing the problem in this manner, it can be solved using a numerical solution of a linear system of equations, which is significantly faster than multidimensional optimization. Note that because this optimization is computed based on the geometry and directivity of each individual microphone in the array, optimal beam design will vary, even within each specific frequency band, as a function of a target focus point for any given beam around the microphone array.

Specifically, the beamformer design process first defines a set of "target beam shapes" as a function of some desired target beam width focus area (i.e., 2-degrees, 5-degrees, 10-degrees, etc.). In general, any conventional function which has a maximum of one and decays to zero can be used to define the target beam shape, such as, for example, rectangular functions, spline functions, cosine functions, etc. However, abrupt functions such as rectangular functions can cause ripples in the beam shape. Consequently, better results are typically achieved using functions which smoothly decay from one to zero, such as, for example, cosine functions. However, any desired function may be used here in view of the aforementioned constraints of a decay function (linear or non-linear) from one to zero, or some decay function which is weighted to force levels from one to zero.

Given the target beam shapes, a "target weight function" is then defined to address whether each target or focus point is in, out, or within a transition area of a particular target beam shape. Typically a transition area of about one to three times the target beam width has been observed to provide good results; however, the optimal size of the transition area is actually dependent upon the types of sensors in the array, and on the environment of the workspace around the sensor array. Note that the focus points are simply a number of points (preferably larger than the number of microphones) that are equally spread throughout the workspace around the array (i.e., using an equal circular spread for a circular array, or an equal arcing spread for a linear array). The target weight functions then provide a gain for weighting each target point depending upon where those points are relative to a particular target beam.

The purpose of providing the target weight functions is to minimize the effects of signals originating from points outside the main beam on beamformer computations. Therefore, in a tested embodiment, target points inside the target beam were assigned a gain of 1.0 (unit gain); target points within the transition area were assigned a gain of 0.1 to minimize the effect of such points on beamforming computations while still considering their effect; finally points outside of the transition area of the target beam were assigned a gain of 2.0 so as to more fully consider and strongly reduce the amplitudes of sidelobes on the final designed beams. Note that using too high of a gain for target points outside of the transition area can have the effect of overwhelming the effect of target points within the target beam, thereby resulting in less than optimal beamforming computations.

Next, given the target beam shape and target weight functions, the next step is to compute a set of weights that will fit real beam shapes (using the known directivity patterns of each microphone in the array as the real beam shapes) into the target beam shape for each target point by using an error minimization technique to minimize the total noise energy for each MCLT frequency subband for each target beam shape. The solution to this computation is a set of weights that match a real beam shape to the target beam shape. However, this set of weights does not necessarily meet the aforementioned constraints of unit gain and zero phase shift in the focus point for each work frequency band. In other words, the initial set of weights may provide more or less than unit gain for a sound source within the beam. Therefore, the computed weights are normalized such that there is a unit gain and a zero phase shift for any signals originating from the focus point.

At this point, the generic beamformer has not yet considered an overall minimization of the total noise energy as a function of beam width. Therefore, rather than simply computing the weights for one desired target beam width, as described above, normalized weights are computed for a range of target beam widths, ranging from some predetermined minimum to some predetermined maximum desired angle. The beam width step size can be as small or as large as desired (i.e., step sizes of 0.5, 1, 2, 5, 10 degrees, or any other step size, may be used, as desired). A one-dimensional optimization is then used to identify the optimum beam width for each frequency band. Any of a number of well-known nonlinear function optimization techniques can be employed, such a gradient descent methods, search methods, etc. In other words, the total noise energy is computed for each target beam width throughout some range of target beam widths using any desired angular step size. These total noise energies are then simply compared to identify the beam width at each frequency exhibiting the lowest total noise energy for that frequency. The end result is an optimized beam width that varies as a function of frequency for each target point around the sensor array.

Note that in one embodiment, this total lowest noise energy is considered as a function of particular frequency ranges, rather than assuming that noise should be attenuated equally across all frequency ranges. In particular, in some cases, it is desirable to minimize the total noise energy within only certain frequency ranges, or to more heavily attenuate noise within particular frequency ranges. In such cases, those particular frequency ranges are given more consideration in identifying the target beam width having the lowest noise energy. One way of determining whether noise is more prominent in any particular frequency range is to simply perform a conventional frequency analysis to determine noise energy levels for particular frequency ranges. Frequency ranges with particularly high noise energy levels are then weighted more heavily to increase their effect on the overall beamforming computations, thereby resulting in a greater attenuation of noise within such frequency ranges.

The normalized weights for the beam width having the lowest total noise energy at each frequency level are then provided for the aforementioned weight matrix. The workspace is then divided into a number of angular regions corresponding to the optimal beam width for any given frequency with respect to the target point at which the beam is being directed. Note that beams are directed using conventional techniques, such as, for example sound source localization (SSL). Direction of such beams to particular points around the array is a concept well known to those skilled in the art, and will not be described in detail herein.

Further, it should be noted that particular applications may require some degree of beam overlap to provide for improved signal source localization. In such cases, the amount of desired overlap between beams is simply used to determine the number of beams needed to provide full coverage of the desired workspace. One example of an application wherein beam overlap is used is provided in a copending patent application entitled "A SYSTEM AND METHOD FOR IMPROVING THE PRECISION OF LOCALIZATION ESTIMATES," filed Mar. 1, 2004, and assigned Ser. No. 10/791,252, the subject matter of which is incorporated herein by this reference. Thus, for example, where a 50-percent beam overlap is desired, the number of beams will be doubled, and using the aforementioned example of the 20-degree beam width at a particular frequency for a circular workspace, the workspace would be divided into 36 overlapping 20-degree beams, rather than using only 18 beams.

In a further embodiment, the beamforming process may evolve as a function of time. In particular, as noted above, the weight matrix and optimal beam widths are computed, in part, based on the noise models computed for the workspace around the microphone array. However, it should be clear that noise levels and sources often change as a function of time. Therefore, in one embodiment, noise modeling of the workspace environment is performed either continuously, or at regular or user specified intervals. Given the new noise models, the beamforming design processes described above are then used to automatically update the set of optimal beams for the workspace.

In view of the above summary, it is clear that the generic beamformer described herein provides a system and method for designing an optimal beam set for microphone arrays of arbitrary geometry and microphone type. In addition to the just described benefits, other advantages of this system and method will become apparent from the detailed description which follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
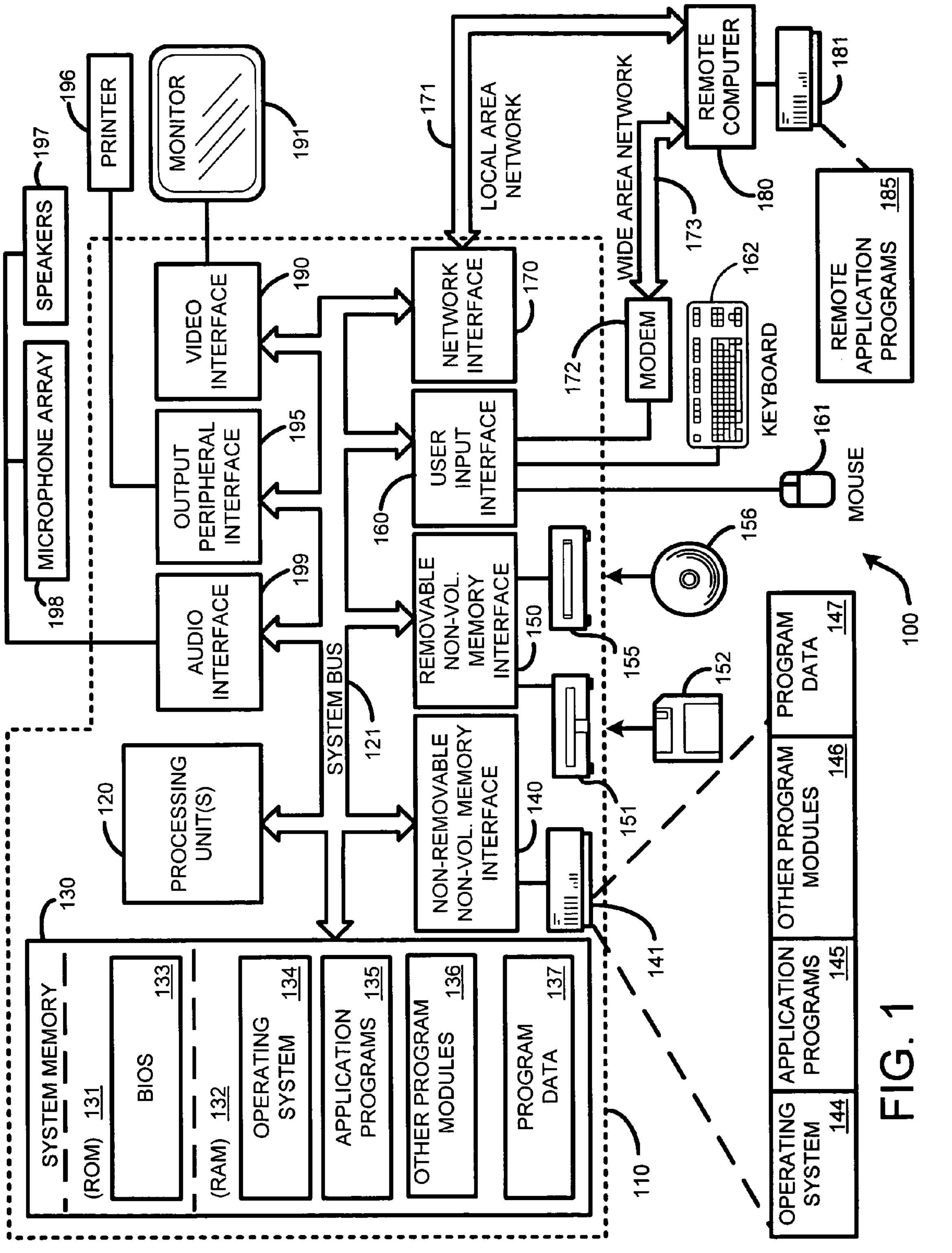
FIG. 1 is a general system diagram depicting a general-purpose computing device constituting an exemplary system for implementing a generic beamformer for designing an optimal beam set for microphone arrays of arbitrary geometry and microphone type.

1.0 Exemplary Operating Environment:

FIG. 1 illustrates an example of a suitable computing system environment 100 with which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198, or other receiver array (not shown), such as, for example, a directional radio antenna array, a radar receiver array, etc. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. Still further input devices (not shown) may include receiving arrays or signal input devices, such as, for example, a directional radio antenna array, a radar receiver array, etc. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of a system and method for automatically designing optimal beams for microphones of arbitrary geometry and microphone type.

2.0 Introduction:

A "generic beamformer," as described herein, automatically designs a set of beams (i.e., beamforming) that cover a desired angular space range or "workspace." Such beams may then be used to localize particular signal sources within a prescribed search area within the workspace around a sensor array. For example, typical space ranges may include a 360-degree range for a circular microphone array in a conference room, or an angular range of about 120- to 150-degrees for a linear microphone array as is sometimes employed for personal use with a desktop or PC-type computer.

However, unlike conventional beamforming techniques, the generic beamformer described herein is capable of designing a set of optimized beams for any sensor array given geometry and sensor characteristics. For example, in the case of a microphone array, the geometry would be the number and position of microphones in the array, and the characteristics would include microphone directivity for each microphone in the array.

Specifically, the generic beamformer designs an optimized set of steerable beams for sensor arrays of arbitrary geometry and sensor type by determining optimal beam widths as a function of frequency to provide optimal signal-to-noise ratios for in-beam sound sources while providing optimal attenuation or filtering for ambient and off-beam noise sources. The generic beamformer provides this beamforming design through a novel error minimization process that determines optimal frequency-dependant beam widths given local noise conditions and microphone array operational characteristics. Note that while the generic beamformer is applicable to sensor arrays of various types, for purposes of explanation and clarity, the following discussion will assume that the sensor array is a microphone array comprising a number of microphones with some known geometry and microphone directivity.

Note that beamforming systems also frequently apply a number of types of noise reduction or other filtering or post-processing to the signal output of the beamformer. Further, time- or frequency-domain pre-processing of sensor array inputs prior to beamforming operations is also frequently used with conventional beamforming systems. However, for purposes of explanation, the following discussion will focus on beamforming design for microphone arrays of arbitrary geometry and microphone type, and will consider only the noise reduction that is a natural consequence of the spatial filtering resulting from beamforming and beamsteering operations. Any desired conventional pre- or post-processing or filtering of the beamformer input or output should be understood to be within the scope of the description of the generic beamformer provided herein.

Further, unlike conventional fixed-beam formation and adaptive beamforming techniques which typically operate in a time-domain, the generic beamformer provides all beamforming operations in the frequency domain. Most conventional audio processing, including, for example, filtering, spectral analysis, audio compression, signature extraction, etc., typically operate in a frequency domain using Fast Fourier Transforms (FFT), or the like. Consequently, conventional beamforming systems often first provide beamforming operations in the time domain, and then convert those signals to a frequency domain for further processing, and then, finally, covert those signals back to a time-domain signal for playback.

Therefore, one advantage of the generic beamformer described herein is that unlike most conventional beamforming techniques, it provides beamforming processing entirely within the frequency domain. Further, in one embodiment, this frequency domain beamforming processing is performed using a frequency-domain technique referred to as Modulated Complex Lapped Transforms (MCLT), because MCLT-domain processing has some advantages with respect to integration with other audio processing modules, such as compression and decompression modules (codecs).

However, while the concepts described herein use MCLT domain processing by way of example, it should be appreciated that these concepts are easily adaptable to other frequency-domain decompositions, such as, for example, FFT or FFT-based filter banks. Consequently, signal processing, such as additional filtering, generating of digital audio signatures, audio compression, etc., can be performed directly in the frequency domain directly from the beamformer output without first performing beamforming processing in the time-domain and then converting to the frequency domain. In addition, the design of the generic beamformer guarantees linear processing and absence of non-linear distortions in the output signal thereby further reducing computational overhead and signal distortions.

2.1 System Overview:

In general, the generic beamformer begins the design of optimal fixed beams for a microphone array by first computing a frequency-dependant "weight matrix" using parametric information describing the operational characteristics and geometry of the microphone array, in combination with one or more noise models that are automatically generated or computed for the environment around the microphone array. This weight matrix is then used for frequency domain weighting of the output of each microphone in the microphone array in frequency-domain beamforming processing of audio signals received by the microphone array.

The weights computed for the weight matrix are determined by calculating frequency-domain weights for a desired "focus points" distributed throughout the workspace around the microphone array. The weights in this weight matrix are optimized so that beams designed by the generic beamformer will provide maximal noise suppression (based on the computed noise models) under the constraints of unit gain and zero phase shift in any particular focus point for each frequency band. These constraints are applied for an angular area around the focus point, called the "focus width." This process is repeated for each frequency band of interest, thereby resulting in optimal beam widths that vary as a function of frequency for any given focus point.

In one embodiment, beamforming processing is performed using a frequency-domain technique referred to as Modulated Complex Lapped Transforms (MCLT). However, while the concepts described herein use MCLT domain processing by way of example, it should be appreciated by those skilled in the art, that these concepts are easily adaptable to other frequency-domain decompositions, such as, for example, FFT or FFT-based filter banks. Note that because the weights are computed for frequency domain weighting, the weight matrix is an N×M matrix, where N is the number of MCLT frequency bands (i.e., MCLT subbands) in each audio frame and M is the number of microphones in the array. Therefore, assuming, for example, the use of 320 frequency bins for MCLT computations, an optimal beam width for any particular focus point can be described by plotting gain as a function of incidence angle and frequency for each of the 320 MCLT frequency coefficients.

Further, it should be noted that when using MCLT processing for beamforming operations, using a larger number of MCLT subbands (e.g., 320 subbands, as in the preceding example) provides two important advantages of this frequency-domain technique: i) fine tuning of the beam shapes for each frequency subband; and ii) simplifying the filter coefficients for each subband to single complex-valued gain factors, allowing for computationally efficient implementations.

The parametric information used for computing the weight matrix includes the number of microphones in the array, the geometric layout of the microphones in the array, and the directivity pattern of each microphone in the array. The noise models generated for use in computing the weight matrix distinguish at least three types of noise, including isotropic ambient noise (i.e., background noise such as “white noise” or other relatively uniformly distributed noise), instrumental noise (i.e., noise resulting from electrical activity within the electrical circuitry of the microphone array and array connection to an external computing device or other external electrical device) and point noise sources (such as, for example, computer fans, traffic noise through an open window, speakers that should be suppressed, etc.)

Therefore, given the aforementioned noise models, the solution to the problem of designing optimal fixed beams for the microphone array is similar to a typical minimization problem with constraints that is solved by using methods for mathematical multidimensional optimization (simplex, gradient, etc.). However, given the relatively high dimensionality of the weight matrix (2M real numbers per frequency band, for a total of N×2M numbers), which can be considered as a multimodal hypersurface, and because the functions are non-linear, finding the optimal weights as points in the multimodal hypersurface is very computationally expensive, as it typically requires multiple checks for local minima.

Consequently, in one embodiment, rather than directly finding optimal points in this multimodal hypersurface, the generic beamformer first substitutes direct multidimensional optimization for computation of the weight matrix with an error minimizing pattern synthesis, followed by a single dimensional search towards an optimal beam focus width. Any conventional error minimization technique can be used here, such as, for example, least-squares or minimum mean-square error (MMSE) computations, minimum absolute error computations, min-max error computations, equiripple solutions, etc.

In general, in finding the optimal solution for the weight matrix, two contradicting effects are balanced. Specifically, given a narrow focus area for the beam shape, ambient noise energy will naturally decrease due to increased directivity. In addition, non-correlated noise (including electrical circuit noise) will naturally increase since a solution for better directivity will consider smaller and smaller phase differences between the output signals from the microphones, thereby boosting the non-correlated noise. Conversely, when the target focus area of the beam shape is larger, there will naturally be more ambient noise energy, but less non-correlated noise energy.

Therefore, the generic beamformer considers a balance of the above-noted factors in computing a minimum error for a particular focus area width to identify the optimal solution for weighting each MCLT frequency band for each microphone in the array. This optimal solution is then determined through pattern synthesis which identifies weights that meet the least squares (or other error minimization technique) requirement for particular target beam shapes. Fortunately, by addressing the problem in this manner, it can be solved using a numerical solution of a linear system of equations, which is significantly faster than multidimensional optimization. Note that because this optimization is computed based on the geometry and directivity of each individual microphone in the array, optimal beam design will vary, even within each specific frequency band, as a function of a target focus point for any given beam around the microphone array.

Specifically, the beamformer design process first defines a set of “target beam shapes” as a function of some desired target beam width focus area (i.e., 2-degrees, 5-degrees, 10-degrees, etc.). In general, any conventional function which has a maximum of one and decays to zero can be used to define the target beam shape, such as, for example, rectangular functions, spline functions, cosine functions, etc. However, abrupt functions such as rectangular functions can cause ripples in the beam shape. Consequently, better results are typically achieved using functions which smoothly decay from one to zero, such as, for example, cosine functions. However, any desired function may be used here in view of the aforementioned constraints of a decay function (linear or non-linear) from one to zero, or some decay function which is weighted to force levels from one to zero.

Given the target beam shapes, a “target weight function” is then defined to address whether each target or focus point is in, out, or within a transition area of a particular target beam shape. Typically a transition area of about one to three times the target beam width has been observed to provide good results; however, the optimal size of the transition area is actually dependent upon the types of sensors in the array, and on the environment of the workspace around the sensor array. Note that the focus points are simply a number of points (preferably larger than the number of microphones) that are equally spread throughout the workspace around the array (i.e., using an equal circular spread for a circular array, or an equal arcing spread for a linear array). The target weight functions then provide a gain for weighting each target point depending upon where those points are relative to a particular target beam.

The purpose of providing the target weight functions is to minimize the effects of signals originating from points outside the main beam on beamformer computations. Therefore, in a tested embodiment, target points inside the target beam were assigned a gain of 1.0 (unit gain); target points within the transition area were assigned a gain of 0.1 to minimize the effect of such points on beamforming computations while still considering their effect; finally points outside of the transition area of the target beam were assigned a gain of 2.0 so as to more fully consider and strongly reduce the amplitudes of sidelobes on the final designed beams. Note that using too high of a gain for target points outside of the transition area can have the effect of overwhelming the effect of target points within the target beam, thereby resulting in less than optimal beamforming computations.

Next, given the target beam shape and target weight functions, the next step is to compute a set of weights that will fit real beam shapes (using the known directivity patterns of each microphone in the array as the real beam shapes) into the target beam shape for each target point by using an error minimization technique to minimize the total noise energy for each MCLT frequency subband for each target beam shape. The solution to this computation is a set of weights that match a real beam shape to the target beam shape. However, this set of weights does not necessarily meet the aforementioned constraints of unit gain and zero phase shift in the focus point for each work frequency band. In other words, the initial set of weights may provide more or less than unit gain for a sound source within the beam. Therefore, the computed weights are normalized such that there is a unit gain and a zero phase shift for any signals originating from the focus point.

At this point, the generic beamformer has not yet considered an overall minimization of the total noise energy as a function of beam width. Therefore, rather than simply computing the weights for one desired target beam width, as described above, normalized weights are computed for a range of target beam widths, ranging from some predetermined minimum to some predetermined maximum desired angle. The beam width step size can be as small or as large as desired (i.e., step sizes of 0.5, 1, 2, 5, 10 degrees, or any other step size, may be used, as desired).

A one-dimensional optimization is then used to identify the optimum beam width for each frequency band. Any of a number of well-known nonlinear function optimization techniques can be employed, such a gradient descent methods, search methods, etc. In other words, the total noise energy is computed for each target beam width throughout some range of target beam widths using any desired angular step size. These total noise energies are then simply compared to identify the beam width at each frequency exhibiting the lowest total noise energy for that frequency. The end result is an optimized beam width that varies as a function of frequency for each target point around the sensor array.

Note that in one embodiment, this total lowest noise energy is considered as a function of particular frequency ranges, rather than assuming that noise should be attenuated equally across all frequency ranges. In particular, in some cases, it is desirable to minimize the total noise energy within only certain frequency ranges, or to more heavily attenuate noise within particular frequency ranges. In such cases, those particular frequency ranges are given more consideration in identifying the target beam width having the lowest noise energy. One way of determining whether noise is more prominent in any particular frequency range is to simply perform a conventional frequency analysis to determine noise energy levels for particular frequency ranges. Frequency ranges with particularly high noise energy levels are then weighted more heavily to increase their effect on the overall beamforming computations, thereby resulting in a greater attenuation of noise within such frequency ranges.

The normalized weights for the beam width having the lowest total noise energy at each frequency level are then provided for the aforementioned weight matrix. The workspace is then divided into a number of angular regions corresponding to the optimal beam width for any given frequency with respect to the target point at which the beam is being directed. Note that beams are directed using conventional techniques, such as, for example sound source localization (SSL). Direction of such beams to particular points around the array is a concept well known to those skilled in the art, and will not be described in detail herein.

Further, it should be noted that particular applications may require some degree of beam overlap to provide for improved signal source localization. In such cases, the amount of desired overlap between beams is simply used to determine the number of beams needed to provide full coverage of the desired workspace. One example of an application wherein beam overlap is used is provided in a copending patent application entitled "A SYSTEM AND METHOD FOR IMPROVING THE PRECISION OF LOCALIZATION ESTIMATES," filed Mar. 1, 2004, and assigned Ser. No. 10/791,252, the subject matter of which is incorporated herein by this reference. Thus, for example, where a 50-percent beam overlap is desired, the number of beams will be doubled, and using the example of the 20-degree beam width provided above for a circular workspace, the workspace would be divided into 36 overlapping 20-degree beams, rather than using only 18 beams.

In a further embodiment of the generic beamformer, the beamforming process may evolve as a function of time. In particular, as noted above, the weight matrix and optimal beam widths are computed, in part, based on the noise models computed for the workspace around the microphone array. However, it should be clear that noise levels and sources often change as a function of time. Therefore, in one embodiment, noise modeling of the workspace environment is performed either continuously, or at regular or user specified intervals. Given the new noise models, the beamforming design processes described above are then used to automatically define a new set of optimal beams for the workspace.

Note that in one embodiment, the generic beamformer operates as a computer process entirely within a microphone array, with the microphone array itself receiving raw audio inputs from its various microphones, and then providing processed audio outputs. In this embodiment, the microphone array includes in integral computer processor which provides for the beamforming processing techniques described herein. However, microphone arrays with integral computer processing capabilities tend to be significantly more expensive than would be the case if the computer processing capabilities could be external to the microphone array, so that the microphone array only included microphones, preamplifiers, A/D converters, and some means of connectivity to an external computing device, such as, for example, a PC-type computer.

Therefore, to address this issue, in one embodiment, the microphone array simply contains sufficient components to receive audio signals from each microphone array and provide those signals to an external computing device which then performs the beamforming processes described herein. In this embodiment, device drivers or device description files which contain data defining the operational characteristics of the microphone array, such as gain, sensitivity, array geometry, etc., are separately provided for the microphone array, so that the generic beamformer residing within the external computing device can automatically design a set of beams that are automatically optimized for that specific microphone array in accordance with the system and method described herein.

In a closely related embodiment, the microphone array includes a mechanism for automatically reporting its configuration and operational parameters to an external computing device. In particular, in this embodiment, the microphone array includes a computer readable file or table residing in a microphone array memory, such as, for example a ROM, PROM, EPROM, EEPROM, or other conventional memory, which contains a microphone array device description. This device description includes parametric information which defines operational characteristics and configuration of the microphone array.

In this embodiment, once connected to the external computing device, the microphone array provides its device description to the external computing device, which then uses the generic beamformer to automatically generate a set of beams automatically optimized for the connected microphone array. Further, the generic beamformer operating within the external computing device then performs all beamforming operations outside of the microphone array. This mechanism for automatically reporting the microphone array configuration and operational parameters to an external computing device is described in detail in a copending patent application entitled "SELF-DESCRIPTIVE MICROPHONE ARRAY," filed Feb. 9, 2004, and assigned Ser. No. 10/775,371, the subject matter of which is incorporated herein by this reference.

In yet another related embodiment, the microphone array is provided with an integral self-calibration system that automatically determines frequency-domain responses of each preamplifier in the microphone array, and then computes frequency-domain compensation gains, so that the generic beamformer can use those compensation gains for matching the output of each preamplifier. As a result, there is no need to predetermine exact operational characteristics of each channel of the microphone array, or to use expensive matched electronic components.

In particular, in this embodiment, the integral self-calibration system injects excitation pulses of a known magnitude and phase to all preamplifier inputs within the microphone array. The resulting analog waveform from each preamplifier output is then measured. A frequency analysis, such as, for example, a Fast Fourier Transform (FFT), or other conventional frequency analysis, of each of the resulting waveforms is then performed. The results of this frequency analysis are then used to compute frequency-domain compensation gains for each preamplifier for matching or balancing the responses of all of the preamplifiers with each other. This integral self-calibration system is described in detail in a copending patent application entitled "ANALOG PREAMPLIFIER MEASUREMENT FOR A MICROPHONE ARRAY," filed Feb. 4, 2004, and assigned Ser. No. 10/772,528, the subject matter of which is incorporated herein by this reference.

Figure 2:
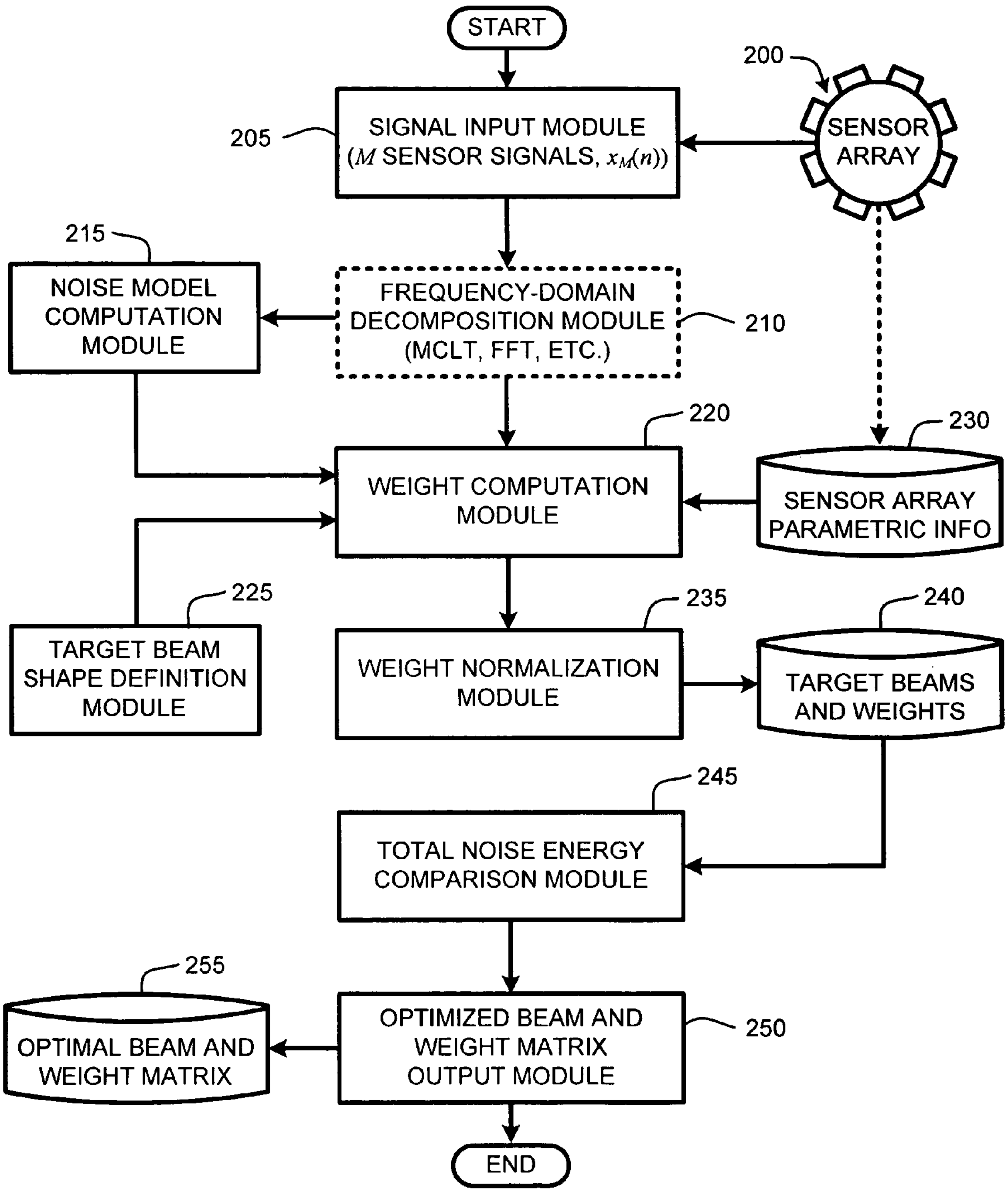
FIG. 2 illustrates an exemplary system diagram showing exemplary program modules for implementing a generic beamformer for designing optimal beam sets for microphone arrays of arbitrary geometry and microphone type.

2.2 System Architecture:

The processes summarized above are illustrated by the general system diagram of FIG. 2. In particular, the system diagram of FIG. 2 illustrates the interrelationships between program modules for implementing a generic beamformer for automatically designing a set of optimized beams for microphone arrays of arbitrary geometry. It should be noted that any boxes and interconnections between boxes that are represented by broken or dashed lines in FIG. 2 represent alternate embodiments of the generic beamformer described herein, and that any or all of these alternate embodiments, as described below, may be used in combination with other alternate embodiments that are described throughout this document.

In general, the generic beamformer operates to design optimized beams for microphone or other sensor arrays of known geometry and operational characteristics. Further, these beams are optimized for the local environment. In other words, beam optimization is automatically adapted to array geometry, array operational characteristics, and workspace environment (including the effects of ambient or isotropic noise within the area surrounding the microphone array, as well as instrumental noise of the microphone array) as a function of signal frequency.

Operation of the generic beamformer begins by using each of a plurality of sensors forming a sensor array 200, such as a microphone array, to monitor noise levels (ambient or isotropic, point source, and instrumental) within the local environment around the sensor array. The monitored noise from each sensor, M, in the sensor array 200 is then provided as an input, $x_M(n)$, to a signal input module 205 as a function of time.

The next step involves computing one or more noise models based on the measured noise levels in the local environment around the sensor array 200. However, in one embodiment, a frequency-domain decomposition module 210 is first used to transform the input signal frames from the time domain to the frequency domain. It should be noted that the beamforming operations described herein can be performed using filters that operate either in the time domain or in the frequency domain. However, for reduced computational complexity, easier integration with other audio processing elements, and additional flexibility, it is typically better to perform signal processing in the frequency domain.

There are many possible frequency-domain signal processing tools that may be used, including, for example, discrete Fourier transforms, usually implemented via the fast Fourier transform (FFT). Further, one embodiment of the generic beamformer provides frequency-domain processing using the modulated complex lapped transform (MCLT). Note that the following discussion will focus only on the use of MCLT's rather than describing the use of time-domain processing or the use of other frequency-domain techniques such as the FFT. However, it should be appreciated by those skilled in the art that the techniques described with respect to the use of the MCLT are easily adaptable to other frequency-domain or time-domain processing techniques, and that the generic beamformer described herein is not intended to be limited to the use of MCLT processing.

Therefore, assuming the use of MCLT signal transforms, the frequency-domain decomposition module 210 transforms the input signal frames (representing inputs from each sensor in the array) from the time domain to the frequency domain to produce N MCLT coefficients, $X_M(N)$ for every sensor input, $x_M(n)$. A noise model computation module 215 then computes conventional noise models representing the noise of the local environment around the sensor array 200 by using any of a number of well known noise modeling techniques. However, it should be noted that computation of the noise models can be skipped for signal certain frames, if desired.

In general, several types of noise models are considered here, including, ambient or isotropic noise within the area surrounding the sensor array 200, instrumental noise of the sensor array circuitry, and point noise sources. Because such noise modeling techniques are well known to those skilled in the art, they will not be described in detail herein. Once the noise model computation module 215 has computed the noise models from the input signals, these noise models are then provided to a weight computation module 220. In one embodiment, computational overhead is reduced by pre-computing the noise models off-line and using those fixed modules; for example a simple assumption of isotropic noises (equal energy from any direction and a particular frequency spectral shape).

In addition to the noise models, the weight computation module 220 also receives sensor array parametric information 230 which defines geometry and operational characteristics (including directivity patterns) of the sensor array 200. For example, when considering a microphone array, the parametric information provided to the generic beamformer defines an array of M sensors (microphones), each sensor having a known position vector and directivity pattern. As is known to those skilled in the art, the directivity pattern is a complex function, giving the sensitivity and the phase shift, introduced by the microphone for sounds coming from certain locations.

Note that there is no requirement for the microphone array to use microphones of the same type or directivity, so long as the position and directivity of each microphone is known. Further, as noted above, in one embodiment, this sensor array parametric information 230 is provided in a device description file, or a device driver, or the like. Also as noted above, in a related embodiment, this parametric information is maintained within the microphone array itself, and is automatically reported to an external computing device which then operates the generic beamformer in the manner described herein.

Further, in addition to the noise models and sensor array parametric information 230, the weight computation module 220 also receives an input of "target beam shapes" and corresponding "target weight functions" from a target beam shape definition module 230. The target beam shape and target weight functions are automatically provided by a target beam shape definition module 225. In general, as noted above, the target beam shape definition module 230 defines a set of "target beam shapes" as a function of some desired target beam width focus area around each of a number of target focus points. As noted above, defining the optimal target beam shape is best approached as an iterative process by producing target beam shapes, and corresponding target weight functions across some desired range of target beam widths (i.e., 2-degrees, 5-degrees, 10-degrees, etc.) for each frequency or frequency band of interest.

The number of target focus points used for beamforming computations should generally be larger than the number of sensors in the sensor array 200, and in fact, larger numbers tend to provide increased beamforming resolution. In particular, the number of target focus points L, is chosen to be larger than the number of sensors, M. These target focus points are then equally spread in the workspace around the sensor array for beamforming computations. For example, in a tested embodiment 500 target focus points, L, were selected for a circular microphone array with 8 microphones, M. These target focus points are then individually evaluated to determine whether they are within the target beam width focus area, within a "transition area" around the target beam width focus area, or outside of the target beam width focus area and outside the transition area. Corresponding gains provided by the target weight functions are then applied to each focus point depending upon its position with respect to the beam currently being analyzed.

In particular, the aforementioned target weight functions are defined as a set of three weighting parameters, $V_{Pass}$, $V_{Trans}$, and $V_{Stop}$ which correspond to whether the target focus point is within the target beam shape ($V_{Pass}$), within a "transition area" around the target focus point ($V_{Trans}$), or completely outside the target beam shape and transition area ($V_{Stop}$). Note that the transition area is defined by some delta around the perimeter of the target beam shape. For example, in a tested embodiment, a delta of three times the target beam width was used to define the transition area. Thus, assuming a ±10-degree target beam width around the focus point, and assuming a delta of three times the target beam width, the transition area would begin at ±10-degrees from the target point and extend to ±40-degrees from the target point. In this example, everything outside of ±40-degrees around the target point is then in the stop area ($V_{Stop}$) The target weight functions then provide a gain for weighting each target point depending upon where those points are relative to a particular target beam.

At this point, the weight computation module 220 has been provided with the target beam shapes, the target weight function, the set of target points, the computed noise models, and the directivity patterns of the microphones in the microphone array. Given this information, the weight computation module 220 then computes a set of weights for each microphone that will fit each real beam shape (using the known directivity patterns of each microphone in the array as the real beam shapes) into the current target beam shape for each target point for a current MCLT frequency subband. Note that as described below in Section 3, this set of weights is optimized by using an error minimization technique to choose weights that will minimize the total noise energy for the current MCLT frequency subband.

A weight normalization module 235 then normalizes the optimized set of weights for each target beam shape to ensure a unit gain and a zero phase shift for any signals originating from the target point corresponding to each target beam shape.

The steps described above are then repeated for each of a range of target beam shapes. In other words, the steps described above for generating a set of optimized normalized weights for a particular target beam shape are repeated throughout a desired range of beam angles using any desired step size. For example, given a step size of 5-degrees, a minimum angle of 10-degrees, and a maximum angle of 60 degrees, optimized normalized weights will be computed for each target shape ranging from 10-degrees to 60-degrees in 5-degree increments. As a result, the stored target beams and weights 240 will include optimized normalized weights and beam shapes throughout the desired range of target beam shapes for each target point for the current MCLT frequency subband.

A total noise energy comparison module 245 then computes a total noise energy by performing a simple one-dimensional search through the stored target beams and weights 240 to identify the beam shape (i.e., the beam angle) and corresponding weights that provide the lowest total noise energy around each target point at the current MCLT subband. These beam shapes and corresponding weights are then output by an optimized beam and weight matrix module 250 as an input to an optimal beam and weight matrix 255 which corresponds to the current MCLT subband.

The full optimal beam and weight matrix 255 is then populated by repeating the steps described above for each MCLT subband. In particular, for every MCLT subband, the generic beamformer separately generates a set of optimized normalized weights for each target beam shape throughout the desired range of beam angles. As described above, the generic beamformer then searches these stored target beam shapes and weights to identify the beam shapes and corresponding weights that provide the lowest total noise energy around each target point for each MCLT subband, with the beam shapes and corresponding weights then being stored to the optimal beam and weight matrix 255, as described above.

Note that except in the case of ideally uniform sensors, such as omni-directional microphones, each sensor in the sensor array 200 may exhibit differences in directivity. Further, sensors of different types, and thus of different directivity, may be included in the same sensor array 200. Therefore, optimal beam shapes (i.e., those beam shapes exhibiting the lowest total noise energy) defined in the optimal beam and weight matrix 255 should be recomputed to accommodate for sensors of different directivity patterns.

3.0 Operational Overview:

The above-described program modules are employed for implementing the generic beamformer described herein. As described above, the generic beamformer system and method automatically defines a set of optimal beams as a function of target point and frequency in the workspace around a sensor array and with respect to local noise conditions around the sensor array. The following sections provide a detailed operational discussion of exemplary methods for implementing the aforementioned program modules. Note that the terms "focus point," "target point," and "target focus point" are used interchangeably throughout the following discussion.

3.1 Initial Considerations:

The following discussion is directed to the use of the generic beamformer for defining a set of optimized beams for a microphone array of arbitrary, but known, geometry and operational characteristics. However, as noted above, the generic beamformer described herein is easily adaptable for use with other types of sensor arrays.

In addition, the generic beamformer described herein may be adapted for use with filters that operate either in the time domain or in the frequency domain. However, as noted above, performing the beamforming processing in the frequency domain provides for reduced computational complexity, easier integration with other audio processing elements, and additional flexibility.

In one embodiment, the generic beamformer uses the modulated complex lapped transform (MCLT) in beam design because of the advantages of the MCLT for integration with other audio processing components, such as audio compression modules. However, as noted above, the techniques described herein are easily adaptable for use with other frequency-domain decompositions, such as the FFT or FFT-based filter banks, for example.

3.1.1 Sensor Array Geometry and Characteristics:

As noted above, the generic beamformer is capable of providing optimized beam design for microphone arrays of any known geometry and operational characteristics. In particular, consider an array of M microphones with a known positions vector $\vec{p}$. The microphones in the array will sample the signal field in the workspace around the array at locations $p_m=(x_m,y_m,z_m)$:m=0,1, . . . , M−1. This sampling yields a set of signals that are denotes by the signal vector $\vec{x}(t, \vec{p})$.

Further, each microphone m has known directivity pattern, $U_m(f,c)$, where f is the frequency and $c=\{\Phi,\theta,\rho\}$ represents the coordinates of a sound source in a radial coordinate system. A similar notation will be used to represent those same coordinates in a rectangular coordinate system, in this case, $c=\{x,y,z\}$. As is known to those skilled in the art, the directivity pattern of a microphone is a complex function which provides the sensitivity and the phase shift introduced by the microphone for sounds coming from certain locations or directions. For an ideal omni-directional microphone, $U_m(f, c)$=constant. However, as noted above, the microphone array can use microphones of different type and directivity patterns without loss of generality of the generic beamformer.

3.1.2 Signal Definitions:

As is known to those skilled in the art, a sound signal originating at a particular location, c, relative to a microphone array is affected by a number of factors. For example, given a sound signal, S(f), originating at point c, the signal actually captured by each microphone can be defined by Equation (1), as illustrated below:

$$X_m(f,p_m)=D_m(f,c)A(f)_mU_m(f,c)S(f) \quad \text{Equation (1)}$$

where the first member, $D_m(f,c)$, as defined by Equation (2) below, represents the phase shift and the signal decay due to the distance from point c to the microphone. Note that any signal decay due to energy losses in the air is omitted as it is significantly lower for working distances typically involved with microphone arrays. However, such losses may be more significant when greater distances are involved, or when other sensor types, carrying media (i.e., water, or other fluids) or signal types are involved.

$$D_m(f,c)=\frac{e^{-j2\pi f v\|c-p_m\|}}{\|c-p_m\|} \quad \text{Equation (2)}$$

The second member of Equation (1), $A(f)_m$, is the frequency response of the microphone array preamplifier/ADC circuitry for each microphone, m. The third member of Equation (1), $U_m(f,c)$, accounts for microphone directivity relative to point c. Finally, as noted above, the fourth member of Equation (1), S(f), is the actual signal itself. 3.1.3 Noise Models:

Given the captured signal, $X_m(f,p_m)$, the first task is to compute noise models for modeling various types of noise within the local environment of the microphone array. The noise models described herein distinguish three types of noise: isotropic ambient nose, instrumental noise and point noise sources. Both time and frequency-domain modeling of noise sources are well known to those skilled in the art. Consequently, the types of noise models considered will only be generally described below.

In particular, the isotropic ambient noise, having a spectrum denoted by the term $N_A(f)$, is assumed to be equally spread throughout the working volume or workspace around the microphone array. This isotropic ambient noise, $N_A(f)$, is correlated in all channels and captured by the microphone array according to Equation (1). In a tested embodiment, the noise model $N_A(f)$ was obtained by direct sampling and averaging of noise in normal conditions, i.e., ambient noise in an office or conference room where the microphone array was to be used.

Further, the instrumental noise, having a spectrum denoted by the term $N_I(f)$, represents electrical circuit noise from the microphone, preamplifier, and ADC (analog/digital conversion) circuitry. The instrumental noise, $N_I(f)$, is uncorrelated in all channels and typically has close to a white noise spectrum. In a tested embodiment, the noise model $N_I(f)$ was obtained by direct sampling and averaging of the microphones in the array in an "ideal room" without noise and reverberation (so that noises would come only from the circuitry of the microphones and preamplifiers).

The third type of noise comes from distinct point sources that are considered to represent noise. For example, point noise sources may include sounds such as, for example, a computer fan, a second speaker that should be suppressed, etc.

3.1.4 Canonical Form of the Generic Beamformer:

As should be clear from the preceding discussion, the beam design operations described herein operate in a digital domain rather than directly on the analog signals received directly by the microphone array. Therefore, any audio signals captured by the microphone array are first digitized using conventional A/D conversion techniques. To avoid unnecessary aliasing effects, the audio signal is preferably processed into frames longer than two times the period of the lowest frequency in the MCLT work band.

Given this digital signal, actual use of the beam design information created by the generic beamformer operations described herein is straightforward. In particular, the use of the designed beams to produce an audio output for a particular target point based on the total input of the microphone array can be generally described as a combination of the weighted sums of the input audio frames captured by the microphone array. Specifically, the output of a particular beam designed by the beamformer can be represented by Equation (3):

$$Y(f)=\sum_{m=0}^{M-1}W_m(f)X_m(f) \quad \text{Equation (3)}$$

where $W_m(f)$ is the weights matrix, W, for each sensor for the target point of interest, and Y(f) is the beamformer output representing the optimal solution for capturing an audio signal at that target point using the total microphone array input. As described above, the set of vectors $W_m(f)$ is an N×M matrix, where N is the number of MCLT frequency bins in the audio frame and M is the number of microphones. Consequently, as illustrated by Equation (3), this canonical form of the beamformer guarantees linear processing and absence of non-linear distortions in the output signal Y(f). A block diagram of this canonical beamformer is provided in FIG. 3.

For each set of weights, $\vec{W}(f)$, there is a corresponding beam shape function, B(f,c), that provides the directivity of the beamformer. Specifically, the beam shape function, B(f, c), represents the microphone array complex-valued gain as function of the position of the sound source, and is given by Equation (4):

$$B(f,c)=\sum_{m=0}^{M-1} W_m(f)D_m(f,c)A(f)_m U_m(f,c) \quad \text{Equation (4)}$$

Figure 3:
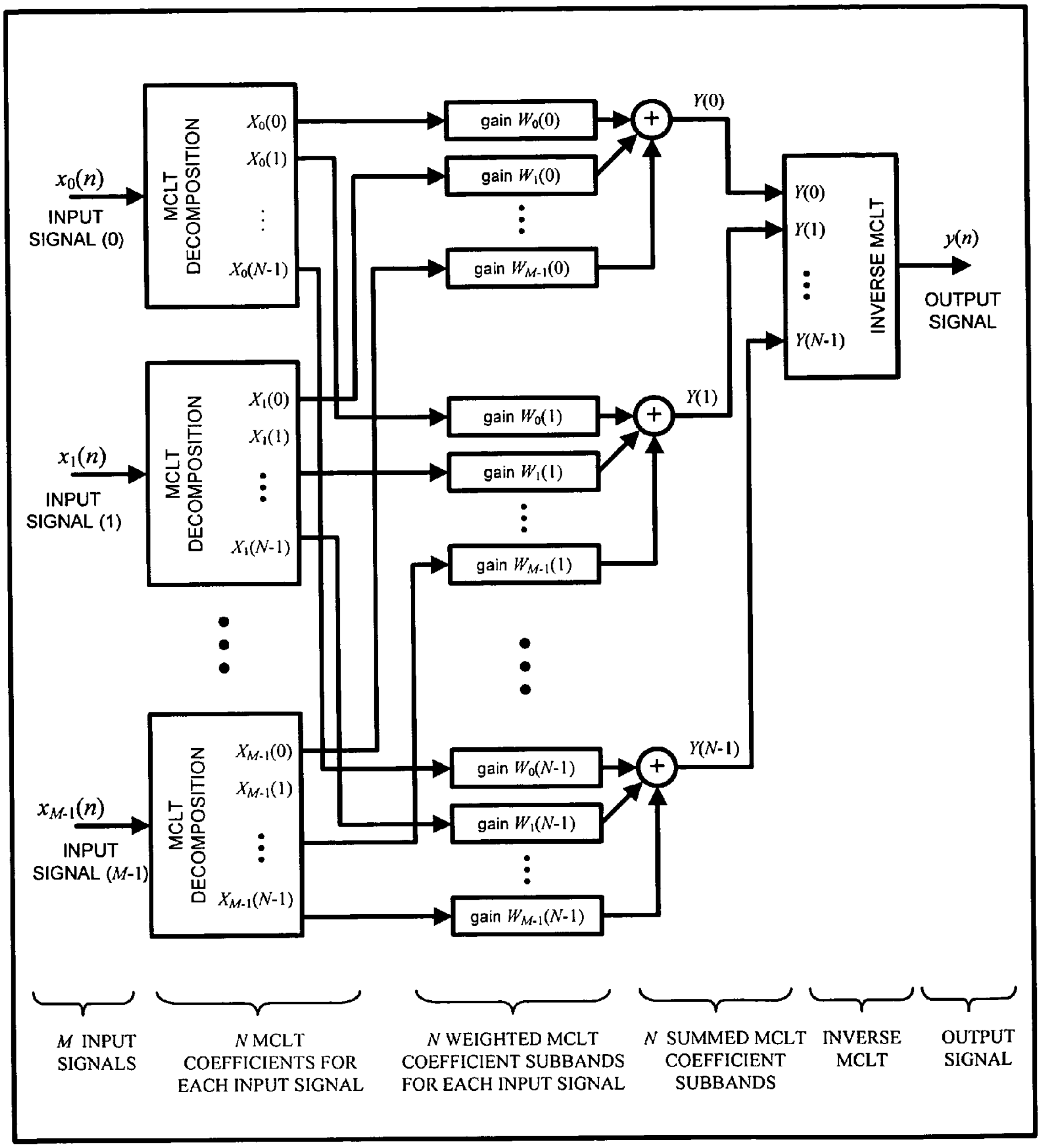
FIG. 3 is a general flowgraph illustrating MCLT-based processing of input signals for a beam computed by the generic beamformer of FIG. 2 to provide an output audio signal for a particular target point.
Figure 4:
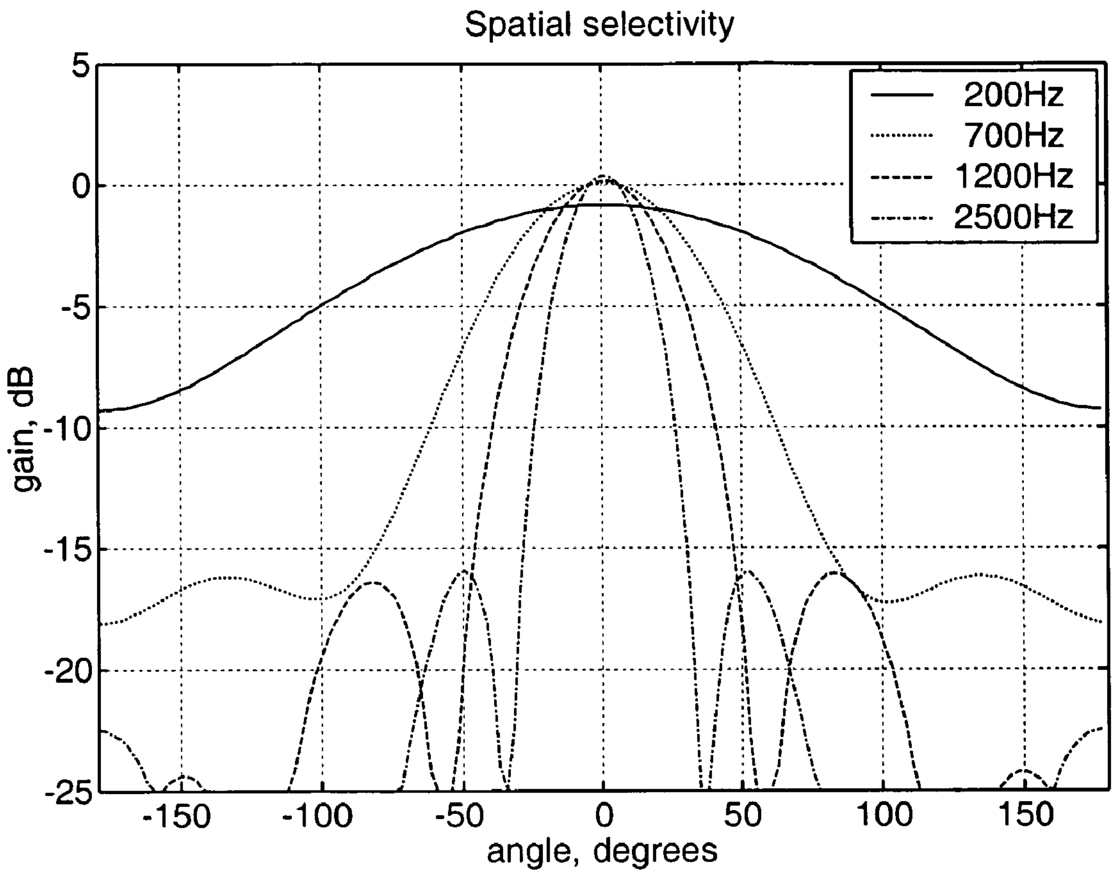
FIG. 4 provides an example of the spatial selectivity (gain) of a beam generated by the generic beamformer of FIG. 2, as a function of frequency and beam angle.

It should be appreciated by those skilled in the art, that the general diagram of FIG. 3 can easily be expanded to be adapted for more complicated systems. For example, the beams designed by the generic beamformer can be used in a number of systems, including, for example, sound source localization (SSL) systems, acoustic echo cancellation (AEC) systems, directional filtering systems, selective signal capture systems, etc. Further, it should also be clear that any such systems may be combined, as desired.

3.1.5 Beamformer Parameters:

As is well known to those skilled in the art, one of the purposes of using microphone arrays is to improve the signal to noise ratio (SNR) for signals originating from particular points in space, or from particular directions, by taking advantage of the directional capabilities (i.e., the "directivity") of such arrays. By examining the characteristics of various types of noise, and then automatically compensating for such noise, the generic beamformer provides further improvements in the SNR for captured audio signals. As noted above, three types of noise are considered by the generic beamformer. Specifically, isotropic ambient noise, instrumental noise, and point source noise are considered.

3.1.5.1 Beamformer Noise Considerations:

The ambient noise gain, $G_{AN}(f)$, is modeled as a function of the volume of the total microphone array beam within a particular workspace. This noise model is illustrated by Equation (5) which simply shows that the gain for the ambient noise, $G_{AN}(f)$, is computed over the entire volume of the combined beam represented by the array as a whole:

$$G_{AN}(f)=\frac{1}{V}\oiiint_V B(f,c)\,dc \quad \text{Equation (5)}$$

where V is the microphone array work volume, i.e., the set of all coordinates c.

The instrumental, or non-correlated, noise gain, $G_{IN}(f)$, of the microphone array and preamplifiers for any particular target point is modeled simply as a sum of the gains resulting from the weights assigned to the microphones in the array with respect to that target point. In particular, as illustrated by Equation (6), the non-correlated noise gain, $G_{IN}(f)$, from the microphones and the preamplifiers is given by:

$$G_{IN}(f)=\sqrt{\sum_{m=0}^{M-1} W_m(f)^2} \quad \text{Equation (6)}$$

Finally, gains for point noise sources are given simply by the gain associated with the beam shape for any particular beam. In other words, the gain for a noise source at point c is simply given by the gain for the beam shape B(f,c).

In view of the gains associated with the various types of noise, a total noise energy in the beamformer output is given by Equation (7):

$$E_N=\int_0^{\frac{f_S}{2}}\sqrt{(G_{AN}(f)N_{AN}(f))^2+(G_{IN}(f)N_I(f))^2}\,df \quad \text{Equation (7)}$$

3.1.5.2 Beamformer Directivity Considerations:

In addition to considering the effects of noise, the generic beamformer also characterizes the directivity of the microphone array resulting from the beam designs of the generic beamformer. In particular, the directivity index DI, of the microphone array can be characterized by Equations (8) through (10), as illustrated below:

$$P(f,\varphi,\theta)=|B(f,c)|^2,\ \rho=\rho_0=const \quad \text{Equation (8)}$$

$$D=\int_{f=0}^{\frac{f_S}{2}}\frac{P(f,\varphi_T,\theta_T)}{\frac{1}{4\pi}\int_0^{\pi}d\theta\int_0^{2\pi}d\varphi\cdot P(f,\varphi,\theta)}\,df \quad \text{Equation (9)}$$

$$DI=10\log_{10}D \quad \text{Equation (10)}$$

where $P(f,\Phi,\theta)$ is called a "power pattern," $\rho_0$ is the average distance (depth) of the work volume, and $(\Phi_T,\theta_T)$ is the steering direction.

3.2 Problem Definition and Constraints:

In general, the two main problems faced by the generic beamformer in designing optimal beams for the microphone array are:

1. Calculating the aforementioned weights matrix, W, for any desired focus point, $c_T$, as used in the beamformer illustrated by Equation (3); and
2. Providing maximal noise suppression, i.e., minimizing the total noise energy (see Equation (7), for example) in the output signal under the constraints of unit gain and zero phase shift in the focus point for the work frequency band. These constraints are illustrated by Equation (11), as follows:

$$\left.\begin{array}{l}|B(f,c_T)|=1\\ \arg(B(f,c_T))=0\end{array}\right. \text{for } \forall f\in[f_{BEG},f_{END}] \quad \text{Equation (11)}$$

where $f_{BEG}$ and $f_{END}$ represent the boundaries of the work frequency band.

These constraints, unit gain and zero phase shift in the focus or target point, are applied for an area around the focus point, called focus width. Given the aforementioned noise models, the generic solution of the problems noted above are similar to a typical minimization problem with constraints which may be solved using methods for mathematical multi-dimensional optimization (i.e., simplex, gradient, etc.). Unfortunately, due to the high dimensionality of the weight matrix W (2M real numbers per frequency band, for a total of N×2M numbers), a multimodal hypersurface, and because the functions are nonlinear, finding the optimal weights as points in the multimodal hypersurface is very computationally expensive, as it typically requires multiple checks for local minima.

3.3 Low Dimension Error Minimization Solution for Weight Matrix, W:

While there are several conventional methods for attempting to solve the multimodal hypersurface problem outlined above, such methods are typically much too slow to be useful in beamforming systems where a fast response is desired for beamforming operations. Therefore, rather than directly attempting to solve this problem, the direct multidimensional optimization of the function defined by Equation (7) under the constraints of Equation (11) is addressed by using a least-squares, or other error minimization technique, error pattern synthesis followed by a single dimensional search towards the focus width for each target or focus point around the microphone array.

Considering the two constraints of Equation (11), it should be clear that there are two contradicting processes.

In particular, given a narrow focus area, the first constraint of Equation (11), unit gain at the focus point, tends to force the ambient noise energy illustrated in Equation (7) to decrease as a result of increased directivity resulting from using a narrow focus area. Conversely, given a narrow focus area, the non-correlated noise energy component of Equation (7) will tend to increase due to that fact that the solution for better directivity tries to exploit smaller and smaller phase differences between the signals from microphones, thereby boosting the non-correlated noise within the circuitry of the microphone array.

On the other hand, when the target focus area is larger there is more ambient noise energy within that area, simply by virtue of the larger beam width. However, the non-correlated noise energy goes down, since the phase differences between the signals from the microphone become less important, and thus the noise effects of the microphone array circuitry has a smaller effect.

Optimization of these contradicting processes results in a weight matrix solution for the focus area width around any given focus or target point where the total noise energy illustrated by Equation (7) is a minimum. The process for obtaining this optimum solution is referred to herein as "pattern synthesis." In general, this pattern synthesis solution finds the weights for the weights matrix of the optimum beam shape which minimizes the error (using the aforementioned least squares or other error minimization technique) for a given target beam shape. Consequently, the solution for the weight matrix is achieved using conventional numerical methods for solving a linear system of equations. Such numerical methods are significantly faster to achieve than conventional multidimensional optimization methods.

3.3.1 Define Set of Target Beam Shapes:

In view of the error minimization techniques described above, defining the target beam shapes is a more manageable problem. In particular, the target beam shapes are basically a function of one parameter—the target focus area width. As noted above, any function with a maximum of one, and which decays to zero can be used to define the target beam shape (this function provides gain within the target beam, i.e., a gain of one at the focus point which then decays to zero at the beam boundaries). However, abrupt functions, such as rectangular functions, which define a rectangular target area, tend to cause ripples in the beam shape, thereby decreasing overall performance of the generic beamformer. Therefore, better results are achieved by using target shape functions that smoothly transition from one to zero.

One example of a smoothly decaying function that was found to produce good results in a tested embodiment is a conventional cosine-shaped function, as illustrated by Equation (12), as follows:

$$T(\rho, \varphi, \theta, \delta) = \cos\left(\frac{\pi(\rho_T - \rho)}{k\delta}\right)\cos\left(\frac{\pi(\varphi_T - \varphi)}{\delta}\right)\cos\left(\frac{\pi(\theta_T - \theta)}{\delta}\right) \quad \text{Equation (12)}$$

where $(\rho_T, \Phi_T, \theta_T)$ is the target focus point, δ is the target area size, and k is a scaling factor for modifying the shape function.

In addition, as noted above, the aforementioned target weight function, $V(\rho,\Phi,\theta)$, is defined as a set of three weighting parameters, $V_{Pass}$, $V_{Trans}$, and $V_{Stop}$ which correspond to whether the target focus point is within the target beam shape ($V_{Pass}$), within a "transition area" around the target focus point ($V_{Trans}$), or completely outside the target beam shape and transition area ($V_{Stop}$). As discussed in greater detail in Section 2.1, the target weight functions provide a gain for weighting each target point depending upon where those points are relative to a particular target beam, with the purpose of such weighting being to minimize the effects of signals originating from points outside the main beam on beamformer computations.

3.3.2 Pattern Synthesis:

Once the target beam shape and the target weight functions are defined, it is a simple matter to identify a set of weights that fit the real beam shape (based on microphone directivity patterns) into the target function by satisfying the least square requirement (or other error minimization technique).

In particular, the first step is to choose L points, with L>M, equally spread in the work space. Then, for a given frequency f, the beam shapes T (see Equation (12)) for given focus area width δ can be defined as the complex product of the target weight functions, V, the number of microphones in the array, M, the phase shift and signal decay D (see Equation (2)), the microphone directivity responses U, and the weights matrix or "weights vector" W. This product can be represented by the complex equation illustrated by Equation (13):

$$T_{1\times L}=V_{1\times L}D_{M\times L}U_{M\times L}W_{1\times M} \quad \text{Equation (13)}$$

The solution to this complex equation (i.e., solving for the optimal weights, W) is then identified by finding the minimum mean-square error (MMSE) solution (or the minimum using other conventional error minimization techniques) for the weights vector W. Note that this weights vector W is denoted below by $\hat{W}$.

3.3.3 Normalization of Weights:

The weight solutions identified in the pattern synthesis process described in Section 3.3.2 fits the actual directivity pattern of each microphones in the array to the desired beam shape T. However, as noted above, these weights do not yet satisfy the constraints in Equation (11). Therefore, to address this issue, the weights are normalized to force a unit gain and zero phase shift for signals originating from the focus point $c_T$. This normalization is illustrated by Equation (14), as follows:

$$\overline{W} = \frac{\hat{W}}{B(f, c_T)}$$ Equation (14)

where $\vec{W}$ represents the optimized normalized weights under the constraints of Equation (11).

3.3.4 Optimization of Beam Width:

As discussed above, for each frequency, the processes described above in sections 3.3.1 through 3.3.3 for identifying and normalizing weights that provide the minimum noise energy in the output signal are then repeated for each of a range of target beam shapes, using any desired step size. In particular, these processes are repeated throughout a range, $[\delta_{MIN}, \delta_{MAX}]$, where δ represents the target area width around each particular target focus point. In other words, the repeat the discussion provided above, the processes described above for generating a set of optimized normalized weights, i.e., weights vector W(f), for a particular target beam shape are repeated throughout a desired range of beam angles using any desired step size for each target point for the current MCLT frequency subband. The resulting weights vector W(f) is the "pseudo-optimal" solution for a given frequency f.

3.3.5 Calculation for the Whole Frequency Band:

To obtain the full weights matrix W for a particular target focus point, the processes described in Section 3.3.1 through 3.3.4 are then simply repeated for each MCLT frequency subband in the frequency range being processed by the microphone array.

3.3.6 Calculation of the Beams Set:

After completing the processes described in Sections 3.3.1 through 3.3.5, the weights matrix W, then represents an N×M matrix of weights for a single beam for a particular focus point $c_T$. Consequently, the processes described above in Sections 3.3.1 through 3.3.5 are repeated K times for K beams, with the beams being evenly placed throughout the workspace. The resulting N×M×K three-dimensional weight matrix specifies the full beam design produced by the generic beamformer for the microphone array in its current local environment given the current noise conditions of that local environment.

4.0 Implementation

In one embodiment, the beamforming processes described above in Section 3 for designing optimal beams for a particular sensor array given local noise conditions is implemented as two separate parts: an off-line design program that computes the aforementioned weight matrix, and a run-time microphone array signal processing engine that uses those weights according to the diagram in FIG. 3. One reason for computing the weights offline is that it is substantially more computationally expensive to compute the optimal weights than it is to use them in the signal processing operation illustrated by FIG. 3.

However, given the speed of conventional computers, including, for example, conventional PC-type computers, real-time, or near real-time computations of the weights matrix is possible. Consequently, in another embodiment, the weights matrix is computed in an ongoing basis, in as near to real-time as the available computer processing power allows. As a result, the beams designed by the generic beamformer are continuously and automatically adapting to changes in the ambient noise levels in the local environment.

Figure 5:
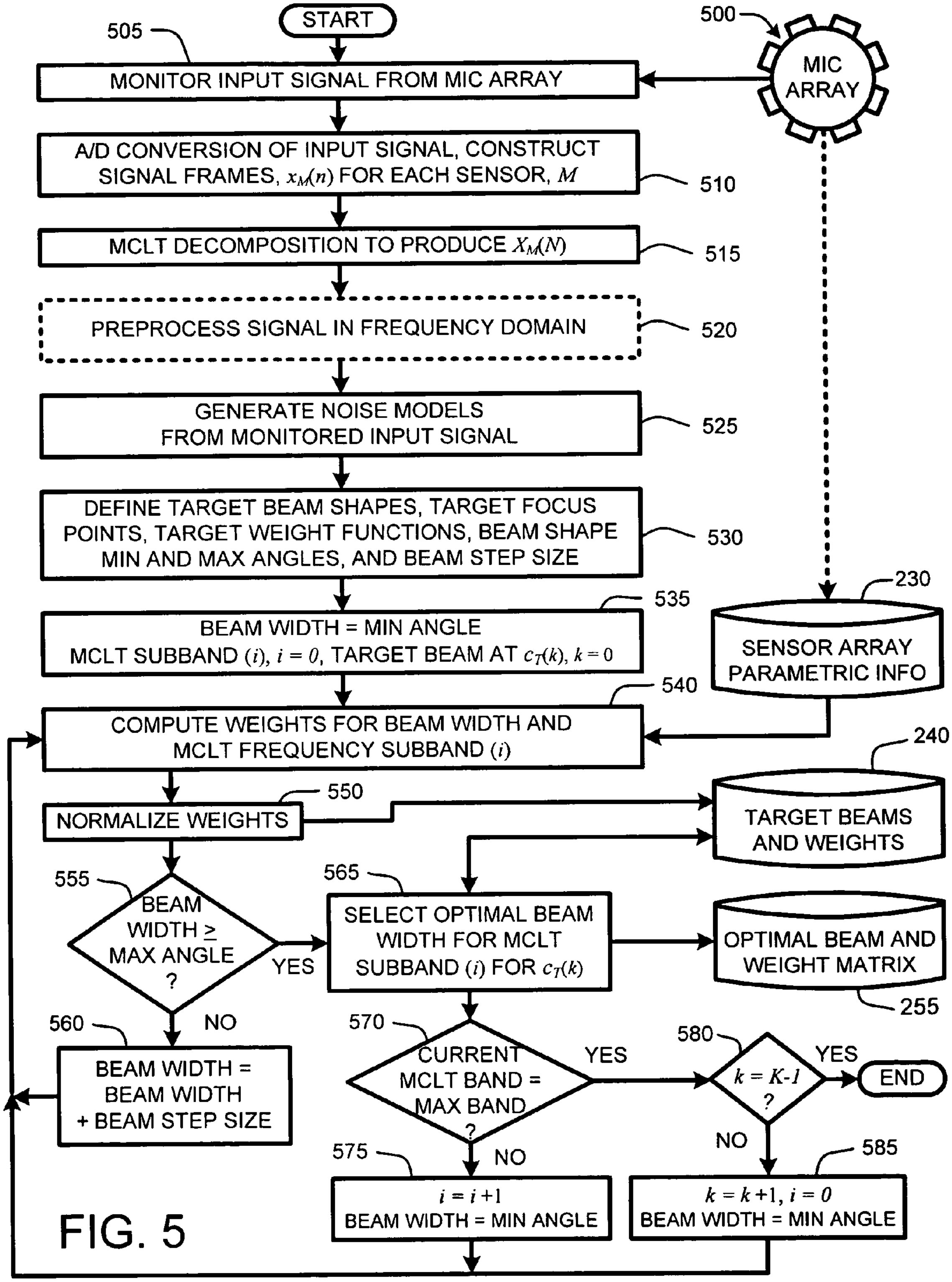
FIG. 5 provides an exemplary operational flow diagram illustrating the operation of a generic beamformer for designing optimal beams for a microphone array.

The processes described above with respect to FIG. 2 and FIG. 3, and in further view of the detailed description provided in Sections 2 and 3 are illustrated by the general operational flow diagram of FIG. 5. In particular, FIG. 5 provides an exemplary operational flow diagram which illustrates operation of the generic beamformer. It should be noted that any boxes and interconnections between boxes that are represented by broken or dashed lines in FIG. 5 represent alternate embodiments of the generic beamformer described herein, and that any or all of these alternate embodiments, as described below, may be used in combination with other alternate embodiments that are described throughout this document.

In general, as illustrated by FIG. 5, beamforming operations begin by monitoring input signals (Box 505) from a microphone array 500 over some period of time sufficient to generate noise models from the array input. In general, as is known to those skilled in the art, noise models can be computed based on relatively short samples of an input signal. Further, as noted above, in one embodiment, the microphone array 500 is monitored continuously, or at user designated times or intervals, so that noise models may be computed and updated in real-time or in near-real time for use in designing optimal beams for the microphone array which adapt to the local noise environment as a function of time.

Once the input signal has been received, conventional A/D conversion techniques 510 are used to construct digital signal frames from the incoming audio signals. As noted above, the length of such frames should typically be at least two or more times the period of the lowest frequency in the MCLT work band in order to reduce or minimize aliasing effects. The digital audio frames are then decomposed into MCLT coefficients 515. In a tested embodiment, the use of 320 MCLT frequency bands was found to provide good results when designing beams for a typical circular microphone array in a typical conference room type environment.

At this point, since the decomposed audio signal is represented as a frequency-domain signal by the MCLT coefficients, it is rather simple to apply any desired frequency domain processing, such as, for example filtering at some desired frequency or frequency range. For example, where it is desired to exclude all but some window of frequency ranges from the noise models, a band-pass type filter may be applied at this step. Similarly, other filtering effects, including, for example high-pass, low-bass, multi-band filters, notch filters, etc, may also be applied, either individually, or in combination. Therefore, in one embodiment, preprocessing 520 of the input audio frames is performed prior to generating the noise models from the audio frames.

These noise models are then generated 525, whether or not any preprocessing has been performed, using conventional noise modeling techniques. For example, isotropic ambient noise is assumed to be equally spread throughout the working volume or workspace around the microphone array. Therefore, the isotropic ambient noise is modeled by direct sampling and averaging of noise in normal conditions in the location where the array is to be used. Similarly, instrumental noise is modeled by direct sampling and averaging of the microphones in the array in an "ideal room" without noise and reverberation (so that noises would come only from the circuitry of the microphones and preamplifiers).

Once the noise models have been generated 525, the next step is to define a number of variables (Box 530) to be used in the beamforming design. In particular, these variables include: 1) the target beam shapes, based on some desired decay function, as described above; 2) target focus points, spread around the array; 3) target weight functions, for weighting target focus points depending upon whether they are in a particular target beam, within a transition area around that beam, or outside the beam and transition area; 4) minimum and maximum desired beam shape angles; and 5) a beam step size for incrementing target beam width during the search for the optimum beam shape. Note that all of these variables may be predefined for a particular array and then simply read back for use in beam design. Alternately, one or more of these variables are user adjustable to provide for more user control over the beam design process.

Counters for tracking the current target beam shape angle (i.e., the current target beam width), current MCLT subband, and current target beam at point $c_T(k)$ are then initialized (Box 535) prior to beginning the beam design process represented by the steps illustrated in Box 540 through Box 585.

In particular, given the noise models and the aforementioned variables, optimal beam design begins by first computing weights 540 for the current beam width at the current MCLT subband for each microphone and target focus point given the directivity of each microphone. As noted above, the microphone parametric information 230 is either maintained in some sort of table or database, or in one embodiment, it is automatically stored in, and reported by the microphone array itself, e.g., the "Self-Descriptive Microphone Array" described above. These computed weights are then normalized 550 to ensure unit gain and zero phase shift at the corresponding target focus point. The normalized weights are then stored along with the corresponding beam shape 240.

Next, a determination 555 is made as to whether the current beam shape angle is greater than or equal to the specified maximum angle from step 530. If the current beam angle is less than the maximum beam angle specified in step 530, then the beam angle is incremented by the aforementioned beam angle step size (Box 560). A new set of weights are then computed 540, normalized 550, and stored 240 based on the new target beam width. These steps (540, 550, 240, and 555) then repeat until the target beam width is greater than or equal to the maximum angle 555.

At this point, the stored target beams and corresponding weights are searched to select the optimal beam width (Box 565) for the current MCLT band for the current target beam at point $c_T(k)$. This optimal beam width and corresponding weights vector are then stored to the optimal beam and weight matrix 255 for the current MCLT subband. A determination (Box 570) is then made as to whether the current MCLT subband, e.g., MCLT subband (i), is the maximum MCLT subband. If it is not, then the MCLT subband identifier, (i), is incremented to point to the next MCLT subband, and the current beam width is reset to the minimum angle (Box 575).

The steps described above for computing the optimal beam and weight matrix entry for the current MCLT subband (540, 550, 240, 555, 560, 565, 255, 570, and 575) are then repeated by the new current MCLT subband until the current MCLT subband is equal to the maximum MCLT subband (Box 570). Once the current MCLT subband is equal to the maximum MCLT subband (Box 570), then the optimal beam and weight matrix will have been completely populated across each MCLT subband for the current target beam at point $c_T(k)$.

However, it is typically desired to provide for more than a single beam for a microphone array. Therefore, as illustrated by steps 580 and 585, the steps described above for populating the optimal beam and weight matrix each MCLT subband for the current target beam at point $c_T(k)$ are repeated K times for K beams, with the beams usually being evenly placed throughout the workspace. The resulting N×M×K three-dimensional weight matrix 255 specifies the full beam design produced by the generic beamformer for the microphone array in its current local environment given the current noise conditions of that local environment.

The foregoing description of the generic beamformer for designing a set of optimized beams for microphone arrays of arbitrary geometry and microphone directivity has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the generic beamformer. It is intended that the scope of the invention be limited not by this detailed description, but rather by the claims appended hereto.

What is claimed is:

1. A method for real-time design of beam sets for a microphone array from a set of pre-computed noise models, comprising using a computing device to:

compute a set of complex-valued gains for each subband of a frequency-domain decomposition of microphone array signal inputs for each of a plurality of beam widths within a range of beam widths, said sets of complex-valued gains being computed from the pre-computed noise models in combination with known geometry and directivity of microphones comprising the microphone array;

search the sets of complex-valued gains to identify a single set of complex-valued gains for each frequency-domain subband and for each of a plurality of target focus points around the microphone array; and wherein each said set of complex-valued gains is individually selected as the set of complex-valued gains having a lowest total noise energy relative to corresponding sets of complex-valued gains for each frequency-domain subband for each target focus point around the microphone array, and wherein each selected set of complex-valued gains is then provided as an entry in said beam set for the microphone array.

2. The method of claim 1 wherein the frequency-domain decomposition is a Modulated Complex Lapped Transform (MCLT).

3. The method of claim 1 wherein the frequency-domain decomposition is a Fast Fourier Transform (FFT).

4. The method of claim 1 wherein the pre-computed noise models include at least one of ambient noise models, instrumental noise models, and point source noise models.

5. The method of claim 4 wherein the ambient noise models are computed by direct sampling and averaging of isotropic noise in a workspace around the microphone array.

6. The method of claim 4 wherein the instrumental noise models are computed by direct sampling and averaging of the output of the microphones in the microphone array in a workspace without noise and reverberation, so that only those noises originating from the circuitry of the microphone array is sampled.

7. The method of claim 1 wherein the total noise energy is computed as a function of the pre-computed noise models and the beam widths in combination with the corresponding sets of complex-valued gains.

8. The method of claim 1 wherein at least one member of the set of pre-computed noise models is recomputed in real-time in response to changes in noise levels around the microphone array.

9. The method of claim 1 wherein the sets of complex-valued gains are normalized to ensure unit gain and zero phase shift for signals originating from each target focus point.

10. The method of claim 1 wherein the range of beam widths is defined by a pre-determined minimum beam width, a pre-determined maximum beam width, and a pre-determined beam width step size.

11. The method of claim 1 wherein the range of beam widths is defined by a user adjustable minimum beam width, a user adjustable maximum beam width, and a user adjustable beam width step size.

12. The method of claim 1 wherein the known geometry and directivity of the microphones comprising the microphone array are provided from a device description file which defines operational characteristics of the microphone array.

13. The method of claim 12 wherein the device description file is internal to the microphone array, and wherein the known geometry and directivity of the microphones comprising the microphone array are automatically reported to the computing device for use in the real-time design of beam sets.

14. The method of claim 1 further comprising a beamforming processor for applying the beam set for real-time processing of incoming microphone signals from the microphone array.

15. A system for automatically designing beam sets for a sensor array, comprising:

monitoring all sensor signal outputs of a sensor array having a plurality of sensors, each sensor having a known geometry and directivity pattern;

generating at least one noise model from the sensor signal outputs;

defining a set of target beam shapes as a function of a set of target beam focus points and a range of target beam widths, said target beam focus points being spatially distributed within a workspace around the sensor array;

defining a set of target weight functions to provide a gain for weighting each target focus point depending upon the position of each target focus point relative to a particular target beam shape;

computing a set of potential beams by computing a set of normalized weights for fitting the directivity pattern of each microphone into each target beam shape throughout the range of target beam widths across a frequency range of interest for each weighted target focus point;

identifying a set of beams by computing a total noise energy for each potential beam across a frequency range of interest, and selecting each potential beam having a lowest total noise energy for each of a set of frequency bands across the frequency range of interest.

16. The system of claim 15 wherein the normalized weights represent sets of complex-valued gains for each subband of a frequency-domain decomposition of sensor array signal inputs.

17. The system of claim 16 wherein the frequency-domain decomposition is a Modulated Complex Lapped Transform (MCLT).

18. The system of claim 16 wherein the frequency-domain decomposition is a Fast Fourier Transform (FFT).

19. The system of claim 15 wherein generating the at least one noise model from the sensor signal outputs comprises computing at least one of an ambient noise model, an instrumental noise model, and a point source noise model through direct sampling and analysis of noise in a workspace around the sensor array.

20. The system of claim 15 wherein computing the total noise energy for each potential beam across a frequency range of interest comprises determining noise energy levels as a function of the at least one noise model and the normalized weights associated with each potential beam.

21. The system of claim 15 wherein at least one of the noise models is automatically recomputed in real-time in response to changes in noise levels around the sensor array.

22. The system of claim 15 wherein the normalized weights for each potential beam ensure unit gain and zero phase shift for signals originating from each corresponding target focus point.

23. The system of claim 15 wherein the range of target beam widths is limited by minimum and maximum beam widths in combination with a beam width angle step size for selecting specific target beam widths across the range of target beam widths.

24. The system of claim 15 wherein the known geometry and directivity of each sensor is automatically provided from a device description file residing within the sensor array.

25. The system of claim 15 further comprising a beamforming processor for real-time steerable beam-based processing of sensor array inputs by applying the set of beams to the sensor array inputs for particular target focus points.

26. A computer-readable medium having computer executable instructions for automatically designing a set of steerable beams for processing output signals of a microphone array, said computer executable instructions comprising:

computing sets of complex-valued gains for each of a plurality of beams through a range of beam widths for each of a plurality of target focus points around the microphone array from a set of parameters, said parameters including one or more models of noise of an environment within range of microphones in the microphone array and known geometry and directivity patterns of each microphone in the microphone array;

wherein each beam is automatically selected throughout the range of beam widths using a beam width angle step size for selecting specific beam widths across the range of beam widths;

computing a lowest total noise energy for each set of complex-valued gains for each target focus point for each beam width; and identifying the sets of complex-valued gains and corresponding beam width having the lowest total noise energy for each target focus point, and selecting each such set as a member of the set of steerable beams for processing the output signals of a microphone array.

27. The computer readable medium of claim 26 wherein the complex-valued gains are normalized to ensure unit gain and zero phase shift for signals originating from corresponding target focus points.

28. The computer readable medium of claim 26 wherein the complex-valued gains are separately computed for each subband of a frequency-domain decomposition of microphone array input signals.

29. The computer readable medium of claim 28 wherein the frequency-domain decomposition is any of a Modulated Complex Lapped Transform (MCLT)-based decomposition, and a Fast Fourier Transform (FFT)-based decomposition.

30. The computer readable medium of claim 26 further comprising a beamforming processor for applying the set of steerable beams for processing output signals of the microphone array.

31. The computer readable medium of claim 30 wherein the beamforming processor comprises a sound source localization (SSL) system for using the optimized set of steerable beams for localizing audio signal sources within an environment around the microphone array.

32. The computer readable medium of claim 31 wherein the beamforming processor comprises an acoustic echo cancellation (AEC) system for using the optimized set of steerable beams for canceling echoes outside of a particular steered beam.

33. The computer readable medium of claim 31 wherein the beamforming processor comprises a directional filtering system for selectively filtering audio signal sources relative to the target focus point of one or more steerable beams.

34. The computer readable medium of claim 31 wherein the beamforming processor comprises a selective signal capture system for selectively capturing audio signal sources relative to the target focus point of one or more steerable beams.

35. The computer readable medium of claim 31 wherein the beamforming processor comprises a combination of two or more of:

a sound source localization (SSL) system for using the optimized set of steerable beams for localizing audio signal sources within an environment around the microphone array;

an acoustic echo cancellation (AEC) system for using the optimized set of steerable beams for canceling echoes outside of a particular steered beam;

a directional filtering system for selectively filtering audio signal sources relative to the target focus point of one or more steerable beams; and a selective signal capture system for selectively capturing audio signal sources relative to the target focus point of one or more steerable beams.

* * * * *